US005644757A

United States Patent [19]

Lee

[11] Patent Number: 5,644,757

[45] Date of Patent: Jul. 1, 1997

[54] APPARATUS FOR STORING DATA INTO A DIGITAL-TO-ANALOG CONVERTER BUILT-IN TO A MICROCONTROLLER

[75] Inventor: Martin Lee, Pingtung Hsien, Taiwan

[73] Assignee: United Microelectronics Corporation, Hsinchu, Taiwan

[21] Appl. No.: 489,385

[22] Filed: Jun. 12, 1995

[51] Int. Cl.$^6$ .............................. G06F 15/00; H04N 17/00

[52] U.S. Cl. ............................ 395/501; 348/190; 345/904

[58] Field of Search ............................ 348/190; 395/162, 395/511, 501, 520, 526; 365/219; 345/904

[56] References Cited

U.S. PATENT DOCUMENTS

| | | | |
|---|---|---|---|
| 3,395,400 | 7/1968 | DeWitt | 341/100 |
| 4,369,504 | 1/1983 | Hanmura | 365/219 |
| 4,447,804 | 5/1984 | Allen | 341/100 |
| 4,654,706 | 3/1987 | Davidson | 348/190 |
| 5,134,702 | 7/1992 | Charych | 395/500 |
| 5,216,504 | 6/1993 | Webb | 348/190 |
| 5,270,821 | 12/1993 | Samuels | 348/552 |
| 5,526,043 | 6/1996 | Wen | 348/190 |

OTHER PUBLICATIONS

Microsoft Press Computer Dictionary, 2d Ed, 1994 ISBN 1-55615-597-2.

*Primary Examiner*—Tod R. Swann
*Assistant Examiner*—Christopher S. Chow
*Attorney, Agent, or Firm*—Ladas & Parry

[57] ABSTRACT

An apparatus for inputting data into a digital-to-analog converter (DAC) in an automatic alignment monitor test system. The digital-to-analog converter is built into a microcontroller of the automatic alignment monitor test system. The apparatus is provided to input data into the DAC provided by an auto-alignment adapter of the automatic alignment monitor test system. A serial-to-parallel interface receives a data access request issued by the auto-alignment adapter. The serial-to-parallel interface converts a multiple of data bits sequentially into a parallel form of data for conversion by the digital-to-analog converter into analog signal. The serial-to-parallel interface has a logic decoder for selecting one of a number of digital-to-analog converter outputs for outputting the converted analog signal to the monitor under test. A set of buffers is located within the microcontroller for providing connection between the serial-to-parallel interface of the microcontroller and the auto-alignment adapter, the set of buffers being also connected to a CPU of the microcontroller for relaying signals issued by the CPU to the serial-to-parallel interface.

5 Claims, 4 Drawing Sheets

APPARATUS FOR STORING DATA INTO A DIGITAL-TO-ANALOG CONVERTER BUILT-IN TO A MICROCONTROLLER

BACKGROUND OF THE INVENTION

1. Field of the Invention

The present invention relates to digital-to-analog converted data accessing in an automatic alignment monitor test system used for video monitor display testing under a specific display mode.

2. Description of the Prior Art

At present, video monitors used in personal computers must be capable of displaying various display modes required by various applications of customers, such as EGA mode, VGA mode, or 780*1024 mode, etc. However, conventional monitors when switching between distinct display modes can not typically display one standard screen frame due to the changes of the horizontal/vertical size/phase (H_size, H_phase, V_4 size, V_phase) and other parameters. As a result, users would then need to manually adjust knobs associated with these parameters (usually in front of the monitors) to appropriately display the monitor frames for various display modes.

To address the framing problem associated with having various display modes, an automatic alignment system can be employed during monitor manufacturing testing to determine optimal parameters of the monitor for the various display modes. The optimal parameters are then stored in memory devices (e.g., EEPROMs in the monitor's control board). When a computer user then wants to use a specific monitor display mode, the optimal parameters stored in the EEPROMs for the specific mode can be fetched and transmitted to the monitor after a digital-to-analog conversion. This will enable the user to achieve the best viewing state for the various display modes.

The configuration of a typical automatic alignment system is shown in FIG. 1 and includes monitor 5, microcontroller 1 mounted on a monitor controlling board (not shown), camera 7, and auto-alignment adapter 3. The method of automatic alignment operates as follows. When the testing begins, microcontroller 1 will transmit predefined display parameters of a specific display mode to monitor 5 over control lines 4 and also to auto-alignment adapter 3 over signal lines 6. Meanwhile, camera 7 visually captures frame information of monitor 5 and also transmits related frame data to auto-alignment adapter 3 over signal lines 8. According to the frame data transmitted from camera 7 and the pre-defined display parameters from microcrontroller 1, auto-alignment adapter 3 will decide whether monitor 5 is in its best state, and if it's not, how much deviation exists between the parameters received from the microcontroller and the data received from the camera. Auto-alignment adapter 3 thens inform microcontroller 1 of the needed display parameter modifications. This process is performed recursively until the optimal parameters of the specific display mode are obtained. Finally, microcontroller 1 stores the code of the display modes under test and their optimal parameters into the monitor control board EEPROMs.

Conventional microcontroller 1 is shown in FIG. 2 and includes CPU 11 connected to communication interface 12 over lines 15 and to memory mapping registers 13 over lines 17. Communication interface 12 is also connected to auto-alignment adapter 3 over signal lines 6. DACs 14 are coupled to monitor 5 over signal lines 4. There are a plurality of DACs in microcontroller 1, some corresponding to every parameter of a display mode and the others reserved for future need. The parameters of the display mode are transmitted between microcontroller 1 and auto-alignment adapter 3 by means of communication interface 12. When auto-alignment adapter 3 needs to access contents of one of the DACs 14 (e.g., when the parameters are to be written into the DAC) CPU 11 addresses corresponding memory mapping registers 13. For example, consider that there are six factors serving as the display mode parameters, including H-size, V-size, H-phase, V-center, Pincusion, Trapzoid. Thus, six corresponding DACs will receive the six factors from corresponding memory mapping registers, respectively. The factor data is in turn converted to analog form and transmitted to the monitor.

The hardware configuration for such a conventional DAC data accessing scheme has disadvantages. First, communication interface 12 must be prepared and stand between auto-alignment adapter 3 and CPU 11 to relay the DAC data accessing request. Such dedicated hardware logic circuitry adds to the overall complexity and cost of the design.

Secondly, communication firmware must be provided for communication interface 12 to commence the communication procedure between CPU 11 and auto-alignment adapter 3 for the transfer of the data. The complexity of the overall system firmware is thereby increased, as well as having an added storage requirement to accomodate this added communication firmware.

And, finally, the task of auto-alignment adapter 3 accessing the DAC data becomes complicated since auto-alignment adapter 3 must issue its request via communication interface 12 to CPU 11. Thereupon, CPU 11 writes the requested data into memory-mapped register 13. This is typically accomplished under control of a software service routine that introduces timing delays in obtaining the data, thereby reducing the overall data acquisition throughput and the production speed.

SUMMARY OF THE INVENTION

It is therefore an object of the present invention to provide an apparatus for inputting data into microcontroller DACs without needing a CPU to implement DAC access via a hardware communication interface, thereby reducing overall system hardware complexity and cost.

It is another object of the present invention to provide an apparatus for inputting data into microcontroller DACs without needing a CPU to implement DAC access via the execution of a software service routine in a hardware communication interface, thereby reducing overall system firmware complexity.

It is yet another object of the present invention to provide an apparatus for inputting data into microcontroller DACs having improved efficiency in data accessing operation while reducing both the hardware and software overall complexity.

The present invention achieves the above-identified objects by providing an inventive apparatus for inputting data into a digital-to-analog converter (DAC). The digital-to-analog converter is built into a microcontroller of a monitor controlling board of a monitor. The apparatus provides for the input of data into the DAC by an external auto-alignment adapter of an automatic alignment monitor test system. A serial-to-parallel interface receives a data access request issued by the auto-alignment adapter. The serial-to-parallel interface then converts a multiple of data bits sequentially into a parallel form of data for conversion by the digital-to-analog converter into analog signal. The serial-to-parallel interface has a logic decoder for selecting one of a number of digital-to-analog converter output channels for outputting the converted analog signal to the monitor under test. The serial-to-parallel interface also has digital logic circuitry for converting the data bits into parallel form. The digital logic circuitry receives the enabling signal for initiating the conversion. Each of the multiple data bits is sequentially shifted into a multi-bit register at the rising edge of one corresponding clock signal pulse supplied to the digital logic means. A set of buffers is located within the microcontroller for providing connection between the serial-to-parallel interface of the microcontroller and the auto-alignment adapter, the set of buffers being also connected to the CPU of the microcontroller for relaying signals issued by the CPU to the serial-to-parallel interface.

Other objects, features and advantages of the present invention will become apparent by way of the following detailed description of the preferred but non-limiting embodiment.

BRIEF DESCRIPTION OF THE DRAWINGS

The detailed description herein is made with reference to the accompanying drawings, wherein.

DETAILED DESCRIPTION OF PREFERRED EMBODIMENTS

Figure 1:
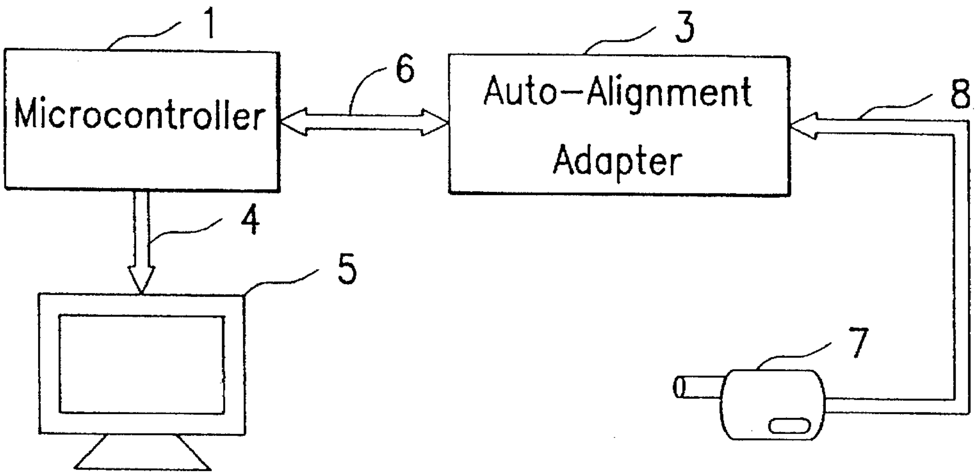
FIG. 1 is an illustrated diagram showing the overall configuration of the automatic alignment monitor test system for evaluating the performance of a monitor under test in various display modes.
Figure 3:
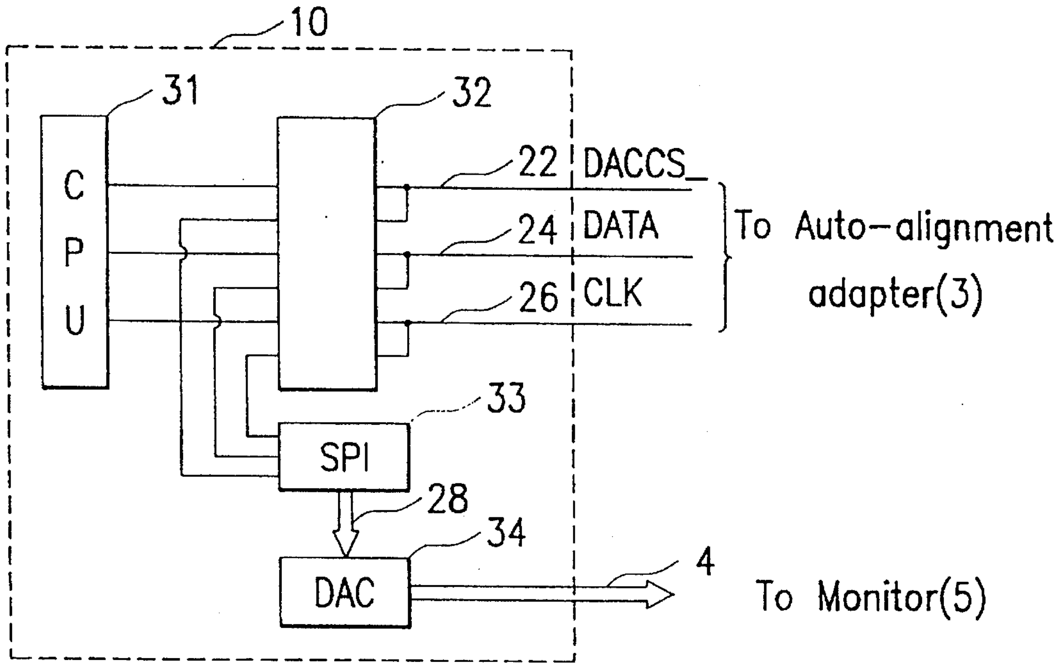
FIG. 3 is a block diagram showing the functional configuration in accordance with a preferred embodiment of the present invention.

Referring to FIG. 3, a block diagram schematically shows the functional configuration of an apparatus in accordance with a preferred embodiment of the present invention. Microcontroller 10 replaces microcontroller 1 as was shown in FIG. 1. Microcontroller 10 includes CPU 31, a set of buffers 32 and serial-to-parallel interface (SPI) 33, in addition to DAC 34 built therein.

The configuration of the present invention as depicted in FIG. 3 fulfills the requirements of auto-alignment adapter 3 in its inputting of data into DAC 34, but without the need for CPU 31 to execute a firmware routine devoted solely to accessing the data. A set of buffers 32 is utilized to allow auto-alignment adapter 3 to efficiently access DACs 34. The embodiment of the present invention features much greater data access throughput since it eliminates the need to implement DAC data accessing through the service of a firmware routine executed by the CPU of the microcontroller.

Figure 2:
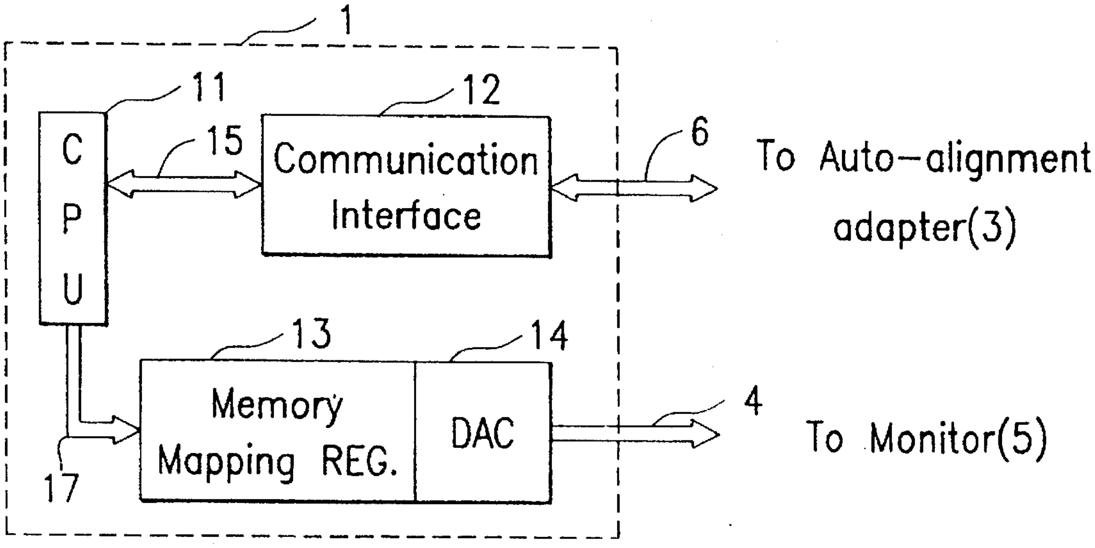
FIG. 2 (PRIOR ART)
FIG. 2 is a block diagram showing the functional configuration of a microcontroller of an automatic alignment monitor test system in the prior art.

As is seen in FIG. 3, control of the scheme employed in the inputting data into DAC 34 by auto-alignment adapter 3 involves the exchange of control signal DACCS_ over signal line 22, serial data signal DATA over data line 24 between CPU 31 of microcontroller 10 and auto-alignment adapter 3 of the automatic alignment monitor test system, under the clocked triggering of a clock signal CLK over clock line 26. The exchange over signal lines 22, 24 and 26 replace those of the prior art involving signal lines 6, communication interface 12 and signal lines 15 as shown in FIG. 2. The definition of the purposes of these signals are DACCS_: Enable signal for built-in DAC 34 in microcontroller 10

CLK: Synchronized position shifting pulse

DATA: A serial multi-bit data signal storing into DAC 34

Figure 4:
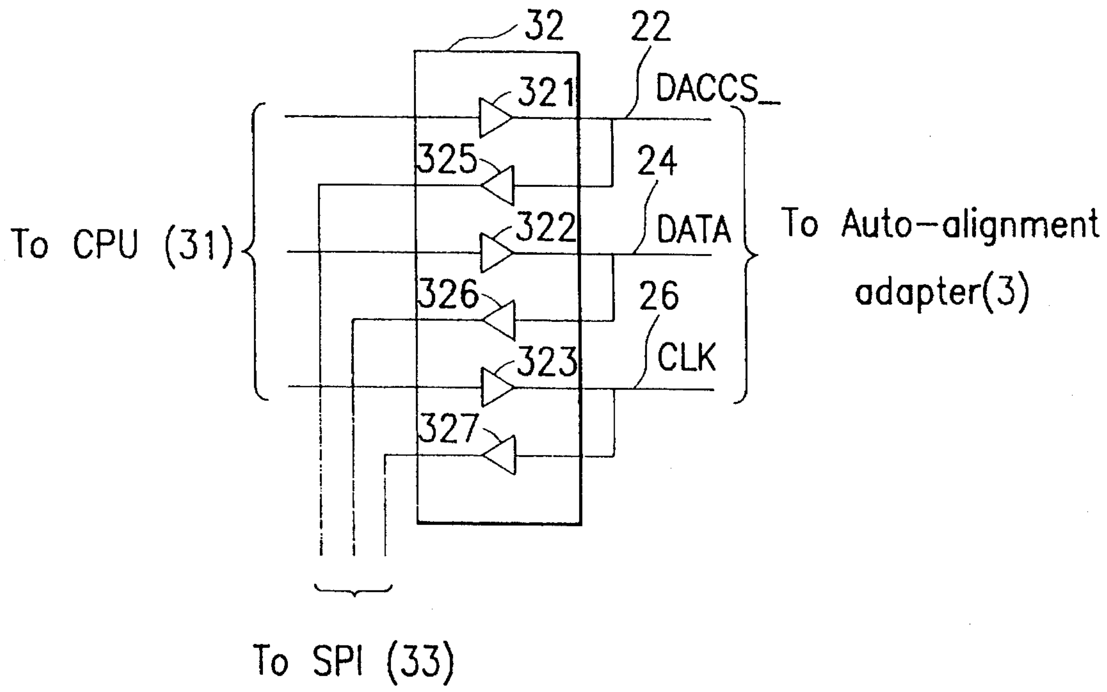
FIG. 4 is a circuit diagram showing the hardware functional configuration of a buffer set in accordance with a preferred embodiment of the present invention.

FIG. 4 is the hardware structural diagram of buffer set 32, which is located between auto-alignment adapter 3, CPU 31, and serial-to-parallel interface (SPI) 33. Buffer set 32 of the present embodiment includes six uni-directional buffers for guiding the data transfer, three buffers 325, 326, 327 being connected from auto-alignment adapter 3 to SPI 33, and three buffers 321, 322, 323 being connected from CPU 31 to auto-alignment adapter 3. As an automatic alignment test is applied to monitor 5 during manufacturing testing, data from auto-alignment adapter 3 is directly transferred to SPI 33 through buffers 326, without the handling of CPU 31. During a customer/user operation, when a display mode for the monitor is chosen which has been tested, CPU 31 will read out prepared optimal parameters for this display mode from the EEPROMs in the monitor controlling board and pass them to SPI 33 through two buffers 322 and 326. As the same manner as passing 24, the DACCS_ 22 and CLK 26 can be transmitted by the buffer pair 321, 325 and the buffer pair 323, 327, respectively. The data, whether from auto-alignment adapter 3 during testing or from CPU 31 during user operation, can be converted into parallel form by SPI 33, which is provided an appropriate register and serves as an input to DAC 34. DAC 34 then operates as in the same manner as in the prior art to provide analog signals to control the display of monitor 5.

Figure 5:
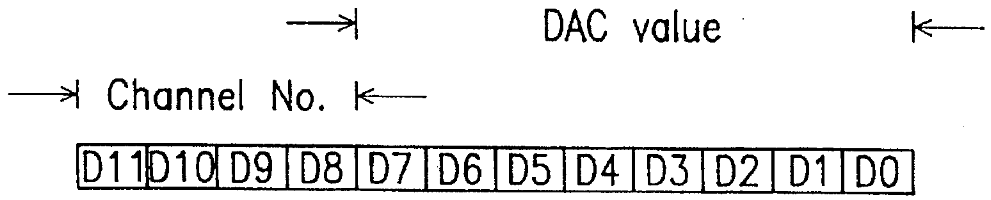
FIG. 5 is an illustrated diagram showing the information contained in the DAC-provided data in accordance with a preferred embodiment of the present invention.

In the example as employed herein for the description of the present invention, serial data signal DATA includes, for example, 12 data bits D11–D0, as shown in FIG. 5. Four most significant bits (MSB) D11–D8 are used for identifying one of the multiple of, for example, 12 DAC channels in DAC 34 that may be selectively assigned to be provided data from auto-alignment adapter 3. Table I below lists the identification code assignment utilizing the four MSBs D11–D8 for the identification of one of the 12 DAC channels, and Table II lists the 256 data values as provided by the DAC channels that may be represented utilizing the other 8 data bits D7–D0 among the 12 data bits. As is seen in Table II, the data provided by each of the 12 DAC channels of DAC 34 is expressed as the proportion of the possible full DAC output value, Vref, that is, a proportion based upon 256 possible values.

TABLE I

| Channel/ID Code | D11 | D10 | D9 | D8 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |

TABLE I-continued

| Channel/ID Code | D11 | D10 | D9 | D8 |
|---|---|---|---|---|
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |

TABLE II

| DAC Value | D7 | D6 | D5 | D4 | D3 | D2 | D1 | D0 |
|---|---|---|---|---|---|---|---|---|
| 256/256 Vref | 0 | 0 | 0 | 0 | 0 | 0 | 0 | 0 |
| 255/256 Vref | 0 | 0 | 0 | 0 | 0 | 0 | 0 | 1 |
| 254/256 Vref | 0 | 0 | 0 | 0 | 0 | 0 | 1 | 0 |
| : | : | : | : | : | : | : | : | : |
| : | : | : | : | : | : | : | : | : |
| : | : | : | : | : | : | : | : | : |
| x/256 Vref | x | x | x | x | x | x | x | x |
| : | : | : | : | : | : | : | : | : |
| : | : | : | : | : | : | : | : | : |
| : | : | : | : | : | : | : | : | : |
| 1/256 Vref | 1 | 1 | 1 | 1 | 1 | 1 | 1 | 1 |

Figure 6:
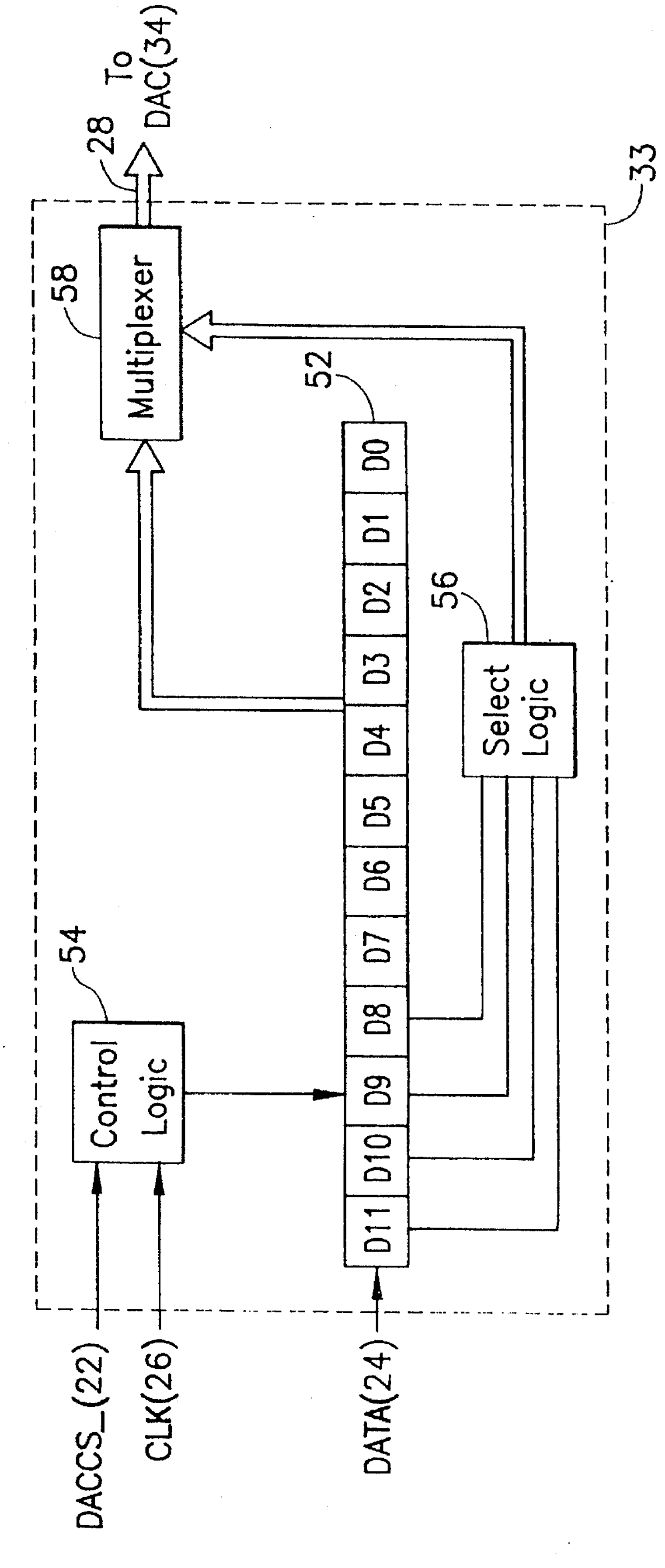
FIG. 6 is an block diagram of an example of the hardware configuration of the serial-to-parallel interface (SPI) in accordance with a preferred embodiment of the present invention.

The block diagram of FIG. 6 shows an example of the hardware configuration of the SPI 33. The SPI 33 includes a shift register 52 having twelve bit locations, which is used for receiving the DATA signal through line 24. It also includes a control logic 54 receiving the DACCS_ signal for initiating conversion of serial-to-parallel form and receiving the CLK signal for sequentially shifting each of data bits into the shift register 52 at the rising edge rising edge of the CLK signal, which is easily implementing, for example, by a gated clock generator. A multiplexer 58 will read data bits D7–D0 of parallel form and transmit to the corresponding channel of DAC 34 through lines 28. This selection of channels is controlled by a select logic 56 according to data bits D11–D8.

Figure 7:
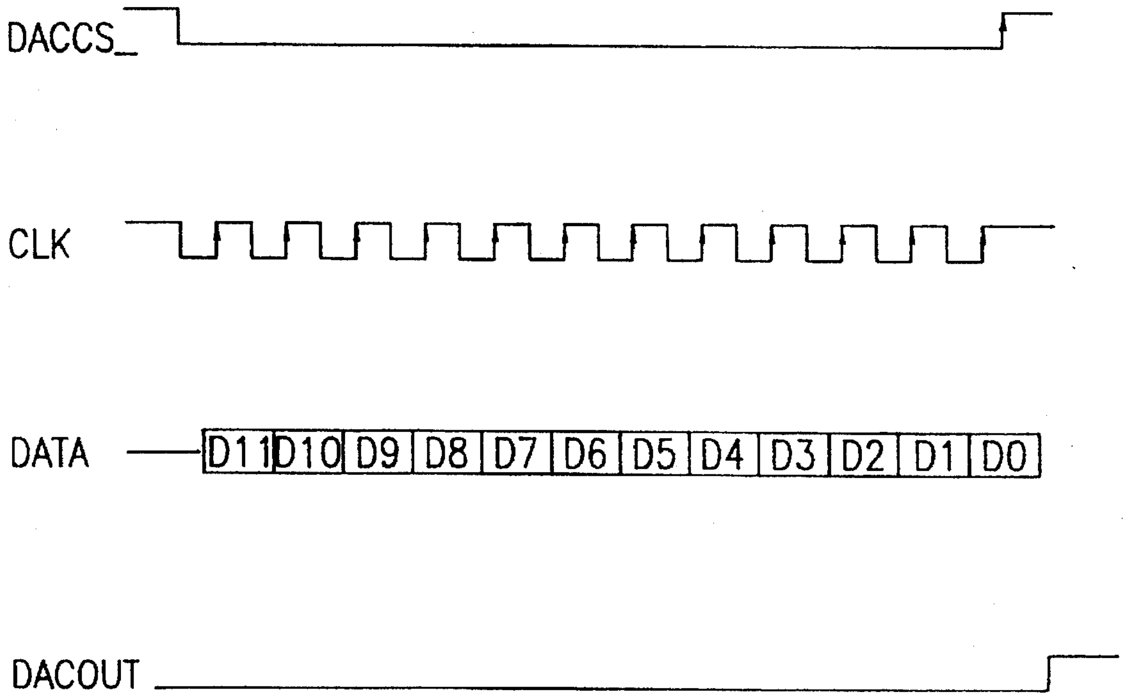
FIG. 7 is a timing diagram showing the access timing sequence of a serial-to-parallel interface in accordance with a preferred embodiment of the present invention.

The timing diagram of FIG. 7 shows the access timing sequence for SPI 33 for inputting data into DAC 34 of microcontroller 10. The timing diagram of FIG. 7 shows the relative timing sequence between DAC 34 access control signal DACCS_ and the data retrieved D11–D0 as stroked by synchronizing clock signal CLK. The name DACCS_ signifies that the DAC enable signal in the embodiment is a negative-activated signal. The appearance of an active DACCS_ signal signifies the start of the serial-to-parallel interfacing operation for the access of the DAC data by auto-alignment adapter 3. Each bit of data input into the DAC, namely, D7–D0, along with the DAC channel identifying code D11–D8, is sequentially shifted into the assigned position in SPI 33 at the rising edge of a synchronizing CLK pulse.

When the last of the D11–D0 data bits are transferred into SPI 33 sequentially in this manner, a serial-to-parallel conversion of the data is completed. The converted data will be provided to DAC 34. Once the DAC channel is identified by the select logic 56 built in SPI 33, the 8-bit data in each DAC channel can then be converted from its digital to an analog form and be output via the correspondingly identified DACOUT channel output to monitor 5 over signal lines 4.

Thus, the process of an auto-alignment adapter inputting data into a DAC built into a microcontroller can then be completed without the need for a CPU to execute a software routine to bring the data to the designated address locations in the addressing space of the CPU. As indicated above, this simplifies both the hardware and software complexity, which, in turn, helps reduce the cost of the system. Data accessing throughput is also improved as well, since the entire access scheme is greatly simplified. Persons skilled in the art, however, can appreciate the fact that although a specific data bit width is proposed during the course of the description of the present invention, such is not intended to restrict the scope of the present invention, which is outlined in the following claims.

What is claimed is:

1. An apparatus for inputting data into a digital-to-analog converter of a microcontroller used in an automatic alignment monitor test system, said apparatus inputting test data into said digital-to-analog converter provided by an auto-alignment means of said automatic alignment monitor test system without said test data passing through a CPU of said microcontroller, said apparatus comprising:

a serial-to-parallel interface, for receiving a data access request issued by said auto-alignment means, said serial-to-parallel interface including:

means for converting a plurality of data bits sequentially into a parallel form of data for conversion by said digital-to-analog converter into a converted analog signal, and logic decoder means for selecting one of a plurality of digital-to-analog converter output channels for outputting said converted analog signal to said monitor.

2. The apparatus for inputting data of claim 1, further comprising a set of buffers connected between said serial-to-parallel interface of said microcontroller and said auto-alignment means, said set of buffers being further connected to said CPU of said microcontroller for relaying signals issued by said CPU to said serial-to-parallel interface.

3. The apparatus for inputting data of claim 1, wherein said means for convening includes digital logic means for receiving an enabling signal for initiating conversion of said plurality of data bits sequentially into said parallel form of data, and for sequentially shifting each of said plurality of data bits into a multi-bit register at a rising edge of one corresponding clock signal pulse supplied to said digital logic means.

4. The apparatus for inputting data of claim 2, wherein said means for convening includes digital logic means for receiving an enabling signal for initiating conversion of said plurality of data bits sequentially into said parallel form of data, and for sequentially shifting each of said plurality of data bits into a multi-bit register at a rising edge of one corresponding clock signal pulse supplied to said digital logic means.

5. The apparatus for inputting data of claim 3, wherein said plurality of data bits includes:

a first group of bits for selectively identifying said one of a plurality of digital-to-analog converter output channels, and a second group of bits for expressing a digital value, said digital value being converted by said digital-to-analog converter for output to said monitor.

* * * * *